INVENTOR
HARRY F. GAMMETER
BY Ray S Pyle

ATTORNEY

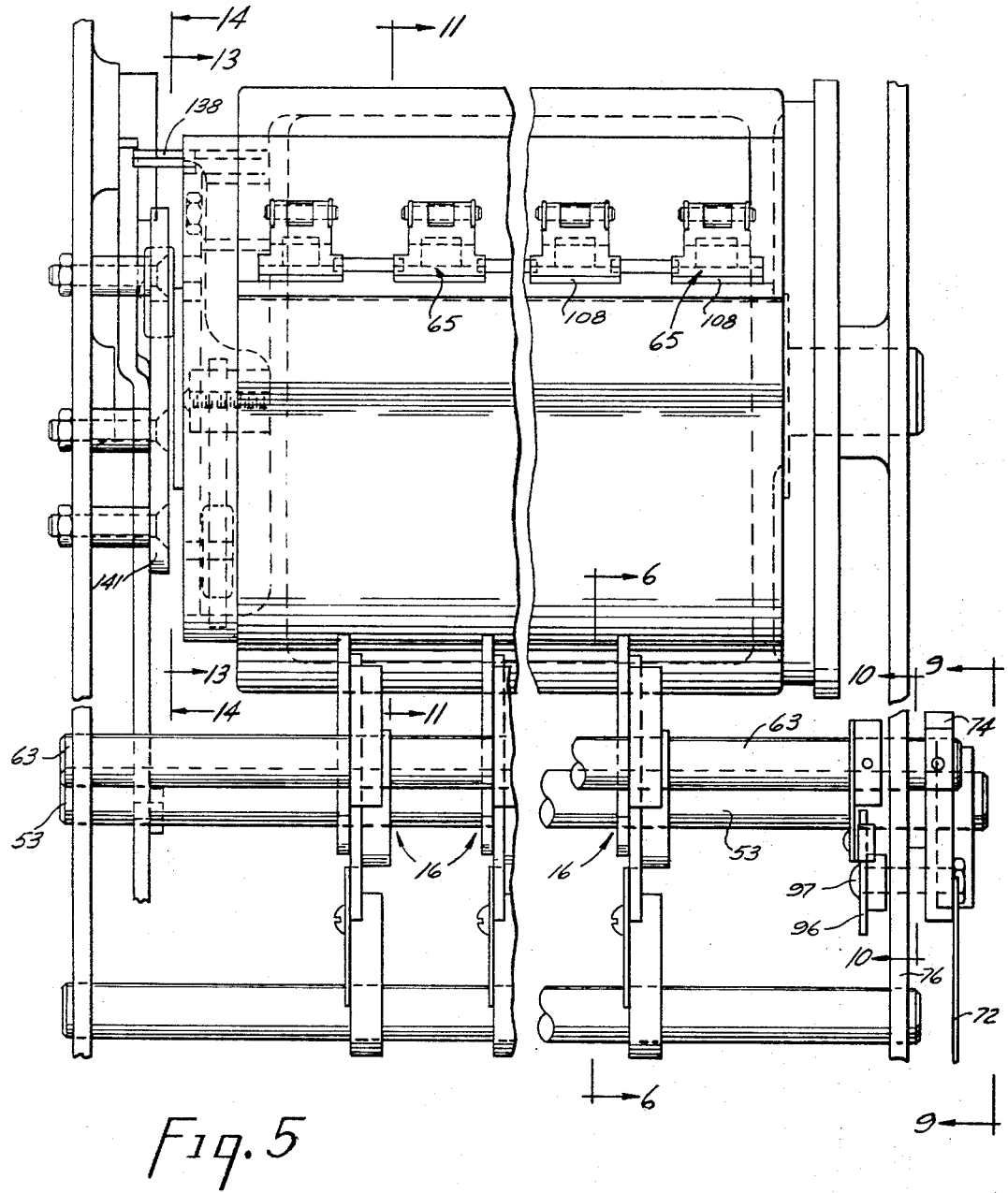

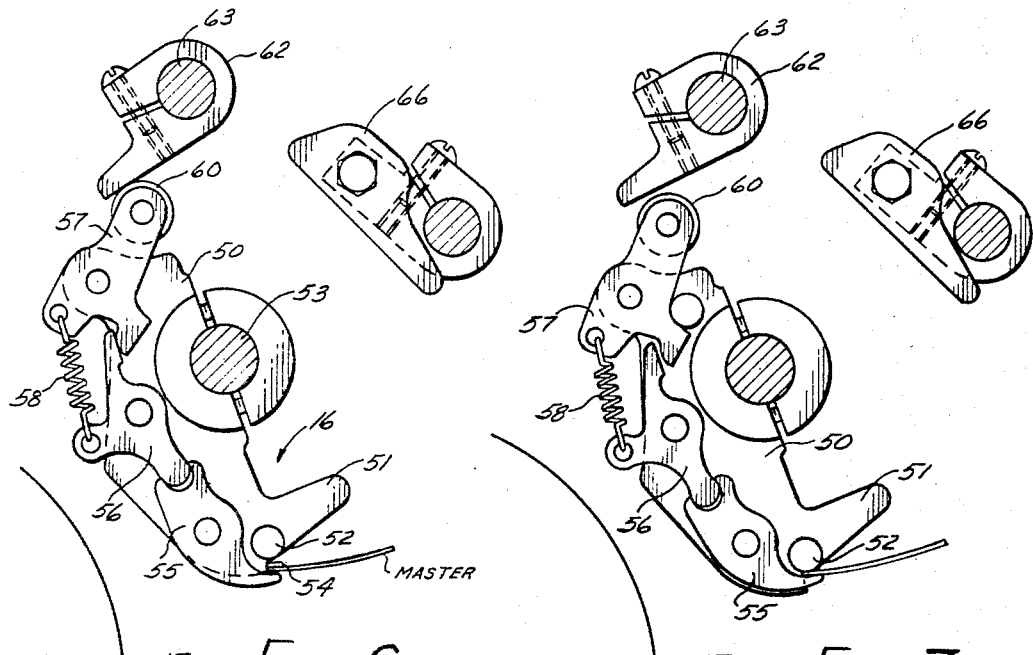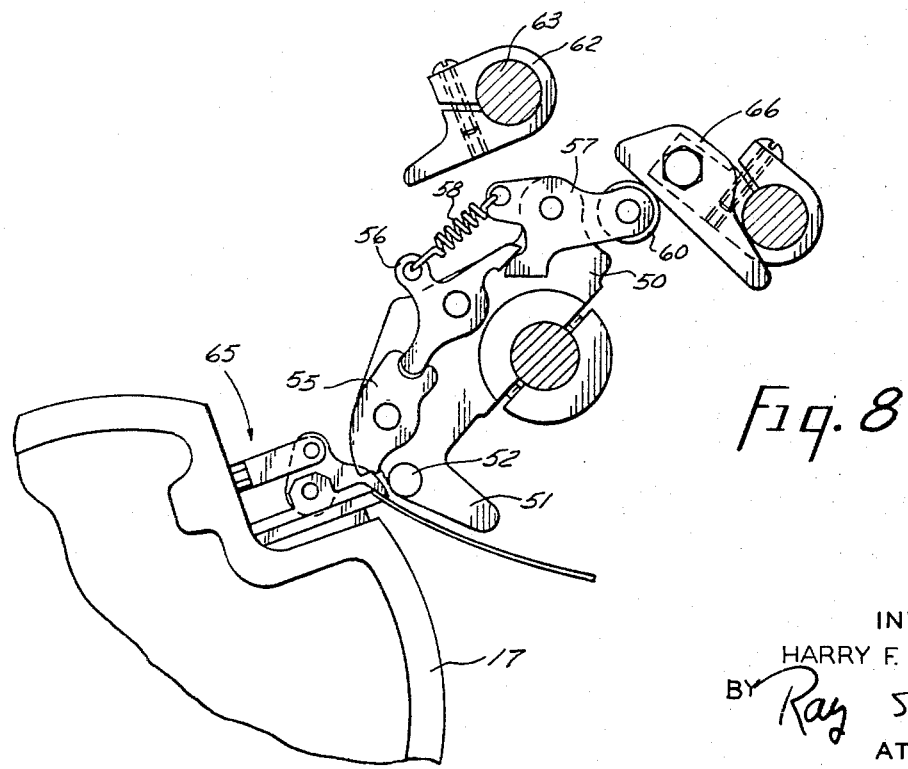

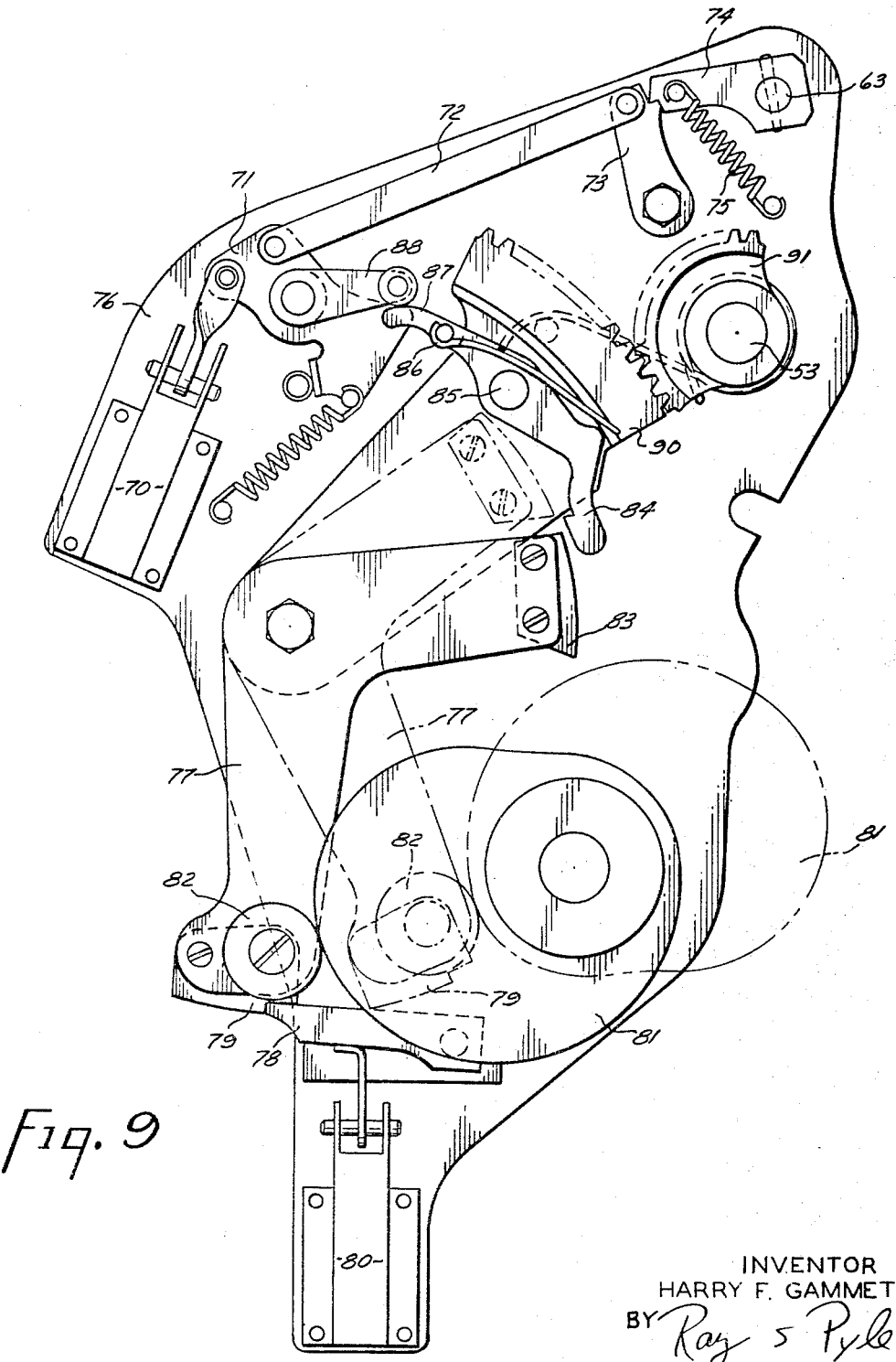

INVENTOR
HARRY F. GAMMETER
BY Ray S Pyle
ATTORNEY 3,420,169
MASTER HANDLING MEANS FOR
DUPLICATING MACHINES
Harry F. Gammeter, Cleveland Heights, Ohio, assignor to Addressograph-Multigraph Corporation, Cleveland, Ohio, a corporation of Delaware
Filed July 29, 1966, Ser. No. 568,837
U.S. Cl. 101—141                                    8 Claims
Int. Cl. B41f 7/00; B41f 13/08

ABSTRACT OF THE DISCLOSURE

A schematic FIGURE 1 shows the general arrangement of a lithographic printing machine, and the balance of the drawing and disclosure teaches the separate wetting conversion of a master, and a master loader which takes the master by its lead edge to a cylinder clamp which accepts the master by its lead edge and draws the master to the cylinder, thus avoiding the dependency upon inherent stiffness to project a master into a cylinder clamp.

Background of the invention

In the lithographic printing process, a master, whether it be on metal or paper, is treated in such manner that the imaged part of the surface becomes ink receptive and the background ink repelling. Thus, no raised configuration is needed to create an ink pattern and apply that pattern to a carrier paper.

The ink repelling portion is wetted with a water solution and thereafter repels oil type inks. The master is placed on the surface of a rotating cylinder, and an ink coated roll known as a form roll applied to the surface of the master. The ink from the form roll will be accepted in the imaged areas and repelled by the wetted areas.

In preparing lithographic masters, the historically accepted method has been to place the master on a bench and hand rub the surface with the wetting solution. With the advent of modern systems practices, the hand application has become too slow, and various efforts have been made to cerate fast processing.

Generally, this invention is directed to the procedure system wherein relatively short runs are made from one master, but many masters are required in a series. For example, prior to this invention, the production of fifty bulletins of twenty-five pages each would require considerable operator attention, even with the more modern fast-loading devices for masters.

The most practical prior systems have been to apply the master in a dry condition to the cylinder and rotate the master while pressing a mechanically held sponge to the master on the cylinder, which sponge is saturated with the wetting solution. Such operation is far more rapid than hand operation and is quite satisfactory for some purposes.

It is undesirable to have excess wetting solution on the cylinder because the inking system consists of a plurality of rollers, one operating against the other, which divide and distribute ink in order to eventually place the ink in an exceedingly thin, uniform layer on the form roll. However, such system is a two-way street, and moisture on the surface of the cylinder, especially if it is in excess supply, can find its way back along the form roller through the inking system and eventually produce enough moisture that the ink is emulsified and will fall from the inking system in chunks and otherwise become unsuitable. The ink-to-water ratio must be carefully balanced in the system to avoid such emulsification.

In prior practice excess moisture has not been too serious a problem because the rate of cycling of masters and the usual number of copies was balanced sufficiently to take away the excess moisture. Faster cycling and fewer copies, therefore, tend to pass more moisture into the inking system from the wetting of the masters than the printing operation takes away. This excess moisture will then find its way back through the ink system and actually collect in the ink fountain. Excessive moisture causes destructive emulsification.

This invention is directed to the improvement in fast operating printing systems using the basic lithographic type of equipment supplemented and improved for rapid replacement of masters and feeding of paper.

There have been numerous suggestions for placing masters on rotating cylinder duplicating machines, of the lithographic type as well as for other types of reproduction. It has been known, for example, to use feed rollers which rotate at the speed necessary to advance a master toward a rotating cylinder and into a clamping device at the speed of the rotating cylinder. For example, the United States Patent 2,051,376 shows the use of a pair of parallel rollers extending crosswise of the machine in front of the cylinder. This system is undoubtedly acceptable for dry masters, but it has been found that erratic results may occur due to the ability of paper to deflect, particularly when wet.

According to this invention, it is desired that the hand wetting of the master be circumvented, in order to speed the application of a series of masters, but to avoid excessive moisture conditions.

Therefore, it is an object of this invention to premoisten all masters before they are applied to the cylinder. Premoistening provides a side benefit in that paper masters function better if there is a few seconds dwell period for the moisture to react chemically with the master surface before ink is applied.

Machine wetting of masters is not necessarily an obvious procedure of dipping the master in a tank or rolling with a sponge. It is known that hand application on the bench produces a superior wetting effect that is not produced by merely applying moisture to the master surface. A rubbing effect is obtained whenever a dry master is placed on the cylinder and a sponge held against the revolving master. This invention embraces the novel concepts of a means for "scrubbing" the surface of a master to properly condition the master with moisture. There is no problem in differential speed rotation of a scrubbing roller with respect to a master whenever the master can be held against being dragged along by the scrubbing roller, but retaining the proper relative speed at the trailing end of a master as it passes through a scrub device has been found to present problems, which have been solved by using a roller having a type of surface a wet paper tends to adhere tenaciously.

As before noted, prewetting of the masters is considered essential in a printing cycle wherein a great number of masters are placed on the cylinder, each for a short run period. It has also been noted that the masters are superior when they are wetted and allowed to stand for a few seconds until the moisture reacts with the surface, but prewetting and aging of the master causes some types of masters to become quite limp. Finally, placing of such limp masters through a roller feed system of conventional nature often results in misdirecting the limp master sheet, and therefore this invention contemplates the novel positive feed system of grasping the master and placing it into the grippers of a master cylinder with no intermediate unsupported period of time between the two, in order that a premoistened master may be machine applied to a cylinder.

Because direct loading involves mechanical apparatus approaching to the surface of the cylinder, this invention also provides for a unique extension of master gripper devices to a position extended from the cylinder surface, in order that mechanical swinging loaders may accelerate a master to the peripheral speed of the cylinder and place the master directly into the closing jaws of the extended gripper devices. The loaders and gripper devices are interspaced in order that they may occupy a merged path of travel for at least a moment of time.

Finally, it is a concept of this invention to provide for extending the master gripper devices for ejecting the master, but at a rotationally offset position with respect to the loading position, and to catch and divert the master by a rapidly rotating means which lifts the master away from the path in which it is being driven at the time the grippers extend the master from the cylinder, and pass the master out onto a receiving dock.

Therefore, this invention is a series of related improvements centered about a lithographic printing machine, providing an entire system for the repetitious preparation of dry masters by properly wetting the masters and feeding the wetted masters by direct mechanical interchange to a set of master cylinder grippers, and after the proper number of printing revolutions, causing those grippers to extend the edge of the master into a diverting and removing star wheel device for taking the master from the cylinder.

*Description of the invention*

FIGURE 5 is a partial top plan view of a master cylinder of a lithographic printing machine, as adapted for this invention, together with a swinging loader arm system for placing masters on the cylinder.

FIGURE 6 is a side elevation, with support shafts in section, illustrating the swinging loader arm system at rest, viewed as taken along line 6—6 of FIGURE 5.

FIGURE 7 is the swinging arm system of FIGURE 6 actuated to grasp a master inserted therein.

FIGURE 8 is the swinging loader arm system of FIGURE 6 actuated to present a master grasped therein to cooperating grippers carried by the master cylinder.

FIGURE 9 is an elevation of the driving system for the swinging loader arm system illustrated in FIGURES 6–8.

FIGURE 10 is an elevation taken substantially as viewed along line 10—10 of FIGURE 5, on a smaller scale, but including a portion of the actuating apparatus illustrated in FIGURE 9.

Figure 1:
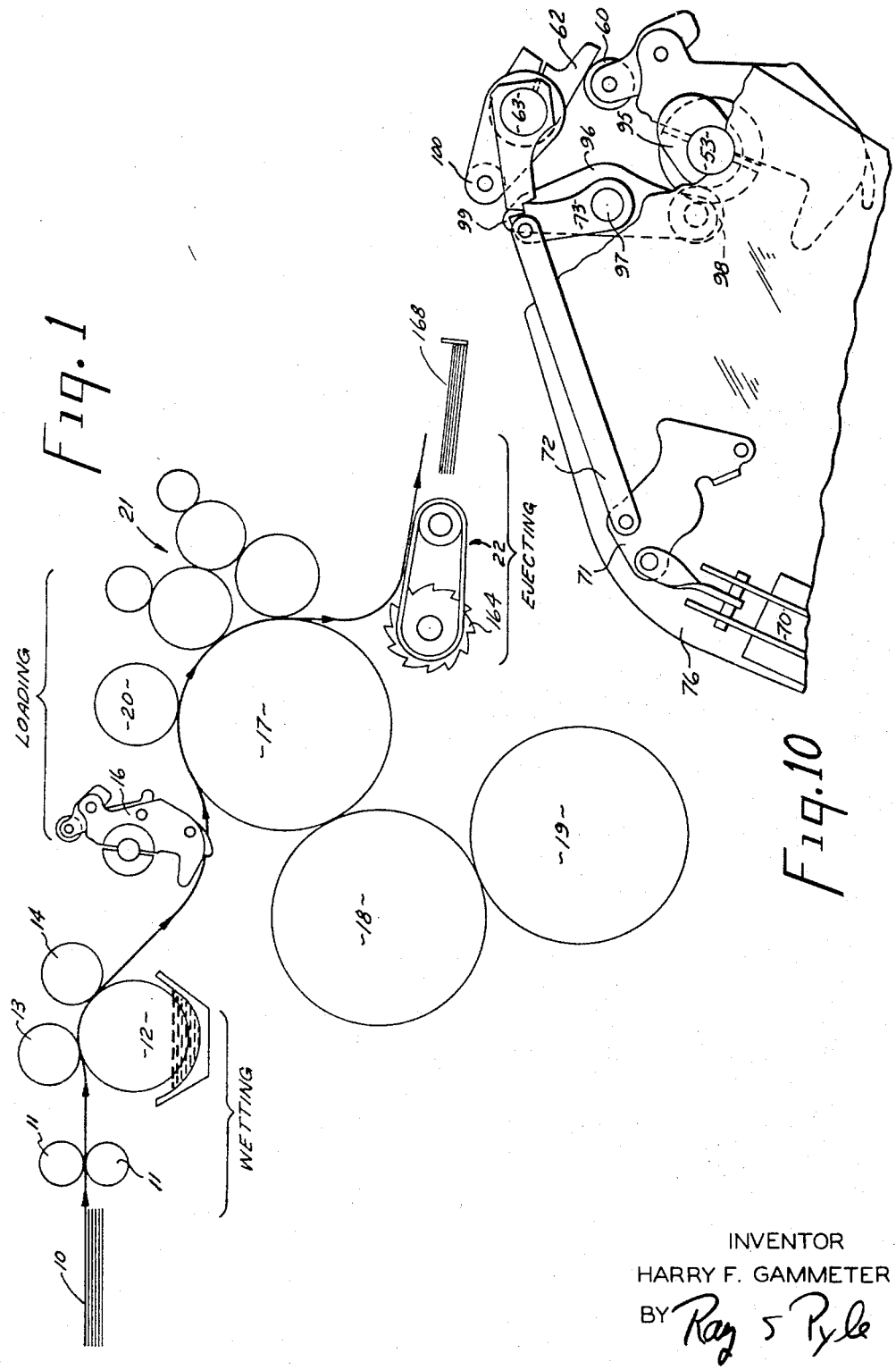
FIGURE 1 is a schematic illustration of the entire system of the present invention.

This invention is a continuation and enlargement upon the structure of a conventional lithographic printing machine, and because such machines are quite complex in structure but are well known and understood, only that portion necessary for an understanding of the present improvement invention is set forth in any detail in the drawings, and the interrelationship of the various views in the drawings is coordinated in the FIGURE 1 for a facile comprehension of the location and operation of the new and improved portion.

Referring to FIGURE 1 of the drawings, a stack of dry masters is indicated by the reference character 10. The motivation for the present invention is the provision of system equipment which can accept a series of previously prepared masters which are to be used for production of a relatively few copies. Often the copies are interrelated with one another such as being the successive pages in a report or brochure. The time required to premoisten and attach these masters by hand or with semiautomatic equipment would keep an operator tied to the machine constantly throughout the printing from the series of masters, due to the short run which is intended to come from each master. As an example, six masters may be run per minute with the equipment of the present invention as illustrated, making eight to ten copies per master.

Therefore, this invention provides for accepting a series of masters and placing the masters one by one in a series into the reproduction process and then ejecting each master as the printing from that master is finished.

The individual masters from the stack 10 are picked up by means of any conventional feeding apparatus, such for example as the vacuum apparatus found on better quality high speed lithographic machines. The individual master is thus lifted from the stack and placed into the bite of mated fed rollers 11 for transfer into a mechanical wetting device symbolized by the fountain roller 12 and the two scrub rollers 13 and 14.

Making of masters is an art of many ramifications. Many materials are available, and techniques for using those materials. The most commonly used material and process is a coating on a backing material which is receptive to the hydrophobic types of grease ink receptive materials but can then be chemically converted into water receptive-grease ink repelling characteristic. By this arrangement, the image can be applied, whereas it cannot be applied if the surface had been originally hydrophilic.

The materials which can thus be converted to a water receptive hydrophilic surface are normally of such nature that if the water solution used for such conversion is merely placed on the surface, it will stand away in droplets and fail to produce a uniform coating and hence fail to produce a uniform conversion. Thus, proper preparation of the surface requires a rubbing action to force the conversion material into intimate contact with each particle of the original coating.

In the past history of the lithographic process, such application of the conversion material was done by hand rubbing because there was no automatic equipment available. Hand application produces good conversion of the surface.

Later development for elimination of this hand task has provided for placing dry masters on the cylinder and pressing a sponge wetted with the solution against the surface of the master as it turns on the cylinder. This provides a rubbing application to cause the forcing of the solution into intimate contact with all of the surface material. The rubbing action is not of sufficient nature to disturb the image, and the surface under the image remains hydrophobic to hold the image. Thus, a master is created which has an ink receptive image with the balance of the sheet being ink repelling.

In this invention, in order to produce the desired rubbing effect, it was contemplated that scrub rollers 13 and 14 could be operated at a differential speed with respect to the fountain roller 12, and no difficulty was seen to be expected so long as the master was held in the bite of the feed rollers 11. By running the scrub rollers 13 and 14 at a faster speed than the roller 12, in a direction tending to pull the master along the path, it was anticipated that once the master left the bite of the feed rollers, there would be no retarding force and, therefore, an acceleration of the master and lack of proper scrubbing at the end portion of the master. This invention discloses the discovery that the provision of fountain roller 12 in a material which tends to adhere to a wet surface of the master, will provide sufficient clinging power to prevent such loss of control, and the master can then be stripped from the face of the fountain roller by means of the stripping apparatus illustrated best in FIGURES 3 and 4.

From the wetting structure, the master is supplied to a swing loader arm system for transfer to grippers of the master cylinder. In FIGURE 1, a partial side elevation of a swinging loader arm 16 is shown. This loader arm 16 is one of several extending across the length of the cylinder in a more complete system to be shown hereinafter. The master is gripped by the loader arms 16 and transferred to grippers carried by a master cylinder 17 for conventional inking and transfer printing.

The use of the loading apparatus of this invention has necessitated the placing of the conventional inking and associated printing equipment in such a way that the area remaining for ejection of the master from the master cylinder 17 is quite limited. Automatic ejection devices are common in this art, but generally they enjoy ample space to remove the master in a direction where it can project naturally into a receiving area without the necessity of being diverted. This system provides associated equipment such as transfer blanket 18, paper impression cylinder 19, a moisture roll system symbolized by roll 20, and the ink system 21 in such a position that the master is caused to be ejected in a vertical direction with no space remaining to continue traveling in a vertical direction. Ejection apparatus indicated generally by the reference character 22 is adapted to catch the forward grip edge of the master as it leaves the master cylinder and divert its path into a horizontal plane where it can be taken from the apparatus. The invention will be described in detail in substantially the order of the outline of the system as set forth in the FIGURE 1.

Figure 2:
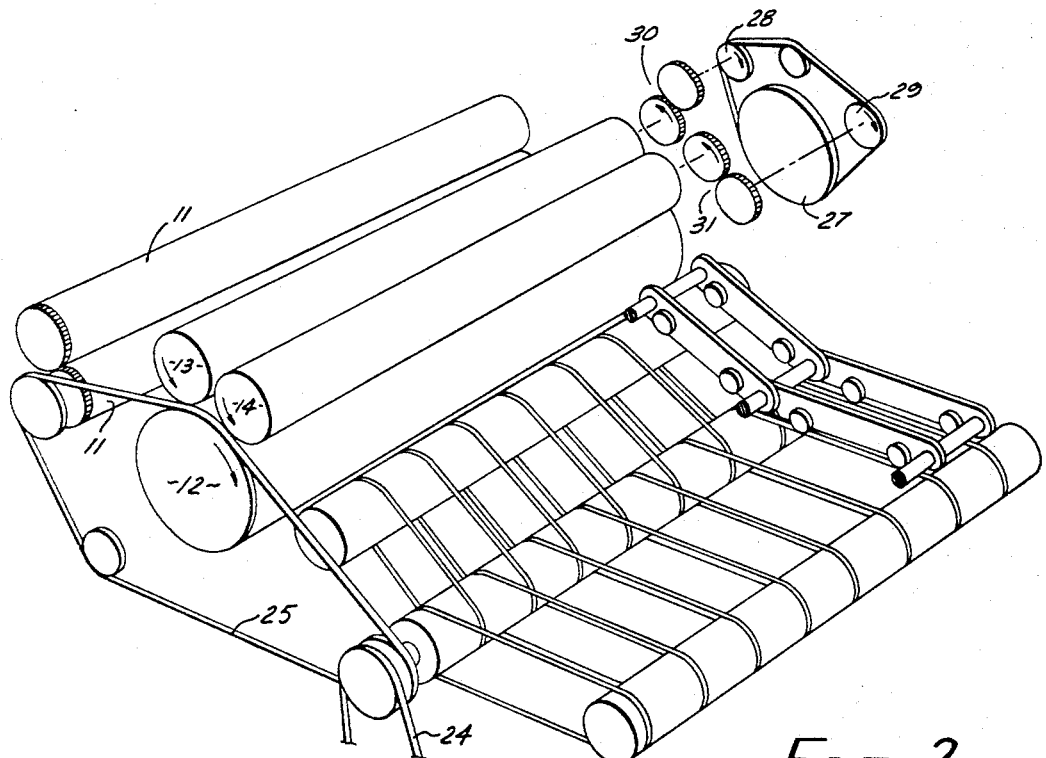
FIGURE 2 is a perspective, substantially schematic and partially exploded illustration of a wetting structure for masters as employed in this invention.

FIGURE 2, although not in exact detail of structure, is an accurate schematic illustration of the apparatus to be found successful for the purpose of properly scrubbing the water repellent solution onto the surface of the dry master. The stack 10, the associated feeding apparatus, and the paper stoppers are omitted from the FIGURE 2.

A driving motor is employed to supply power to the entire machine, with various drive take-off areas. This power source is not illustrated in the drawings, but a chain 24 is shown in FIGURE 2 as the source of driving power to the wetting apparatus. A drive chain 25 interconnects the fountain roller 12 with the feed rollers 11 in order to coordinate their drive speed. Power is taken from the opposite end of the roller 12 in a system which includes a gear 27 driven by the roller 12 operating through two smaller gears 28 and 29. Gear 28 operates gear train 30 to drive scrub roller 13, and gear 29 operates gear train 31 to drive the scrub roller 14. The size of the gear train and the driving apparatus for the gear train is such that the scrub rollers 13 and 14 operate in a direction and at a speed which causes the rollers 13 and 14 to over-run the fountain roller 12 and act to drive the master in its forward path.

Figure 3:
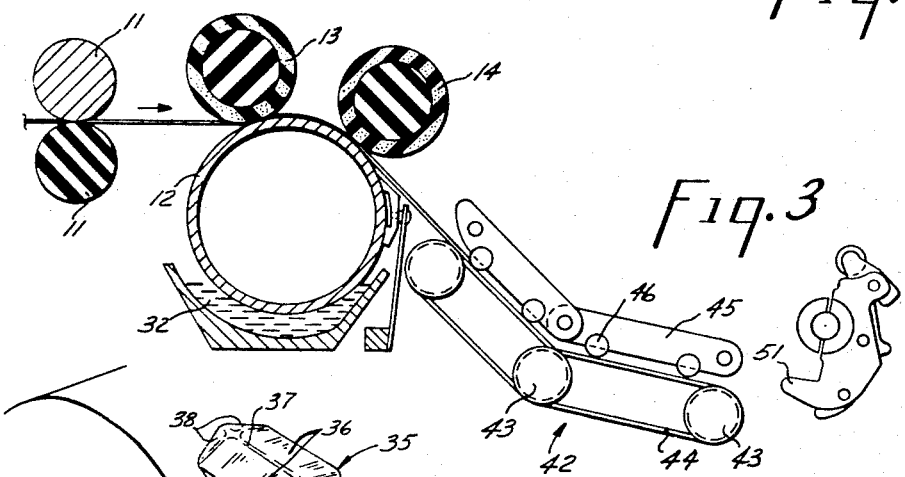
FIGURE 3 is a schematic longitudinal section view of the FIGURE 2 device.

In FIGURE 3, the rollers 13 and 14 are indicated as being a resilient or rubber material mounted upon a more solid core. The surface material is of a sponge character in that it can carry and release moisture, and is relatively stiff to resist distortion and rapid deterioration, but not sufficiently stiff to tear and destroy a paper master. By rotating the rollers 13 and 14 at a peripheral speed greater than the peripheral speed of the roller 12, the differential action will cause a rubbing and scrubbing action upon the master passing therethrough. There must be enough solution in the roller nips and/or cover material to wet the entire length of a 17″ master. The master cuts off the supply as it enters the nip of the first applicator and fountain rollers.

This portion of the invention has been the discovery that a master can be gripped with sufficient holding force by selection of a material for the roller 12 of such nature that a wet paper master will cling to the surface of the roller 12 against the drive of the faster moving scrub rollers. Thus, the difficulty of a rapid acceleration of the master after it is released from the bite of the feed rollers 11 is avoided. The surface of the fountain roller 12 is wetted by running in a bath 32 of solution and this solution is carried on the surface of the roller 12 to the sponge covers of the rollers 13 and 14 during the period when there is no master being prepared. Therefore, the rollers 13 and 14 are always properly supplied with moisture. As the master passes over roller 12, it is wetted on the back and is caused to cling to the surface of the roller and is held tight to the surface during the entire scrubbing operation. The preferred surface for roller 12 is polished hard chrome. This material will cling to wet paper with a high tenacity, and will resist wear of rubber paper separating devices.

Figure 4:
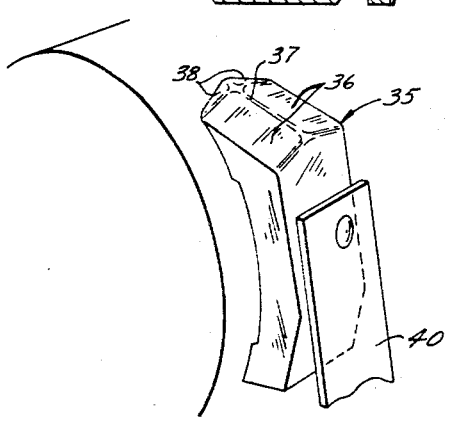
FIGURE 4 is an enlarged perspective detail of a stripping guide shown in FIGURE 3.

In order to separate the master from the surface of the roller 12, to break the clinging action, a series of closely fitted stripper devices 35 has been devised. One of the strippers 35 is illustrated in FIGURES 3 and 4, but the series of strippers is omitted in FIGURE 2 to avoid confusion.

It has been found that unless the stripping device is properly formed, it will tend to collect the moisture and apply it in extra heavy strips along the area of the master which contacts the stripper. The illustrated stripping device 35 has been developed wherein a roof configuration top surface having two angular surface areas 36 extending laterally from a central ridge 37 causes a spreading and shedding of the moisture, and this spreading and shedding is further aided and emphasized by downwardly sloping forward flat areas 38. The face of the device 35 is formed to adhere closely to the shape of the fountain roller 12, and by making the body of the stripper device 35 of a material softer than the preferred hard chrome of the fountain roller 12, the edge of the flat area 38 is constantly honed to razor sharpness for faultless stripping of the wetted master from the fountain surface. Wet paper tends to become lodged in minute areas, and hence this constant honing is found to be a desirable adjunct to continuous maintenance-free and successful performance of this invention. The stripper device is held tight to the surface of the fountain roller 12 by means of a spring 40.

A conveyor system 42 is positioned to accept a master coming from the wetting device. The conveyor is composed of rollers 43 with interlaced elastic belts 44, and because the masters do not tend to cling to the surface of such elastic belts and convey properly, trucks 45 with rollers 46 thereon are positioned over the surface of the conveyor system and urge the wetted master against the elastic belts for conveyance.

Installation on master cylinder

There are many devices for applying a master to a rotating cylinder, operating on various principles, and many of them which operate much in the manner of the feed rollers 11. However, such feed devices generally operate on dry masters which have an inherent stiffness enabling accuracy of projection, but even with dry, stiff masters, projection feeding results in some vagrancy. After some types of masters have passed through the wetting apparatus shown in FIGURE 2, they no longer have the inherent stiffness of a dry sheet. Furthermore, it is desirable to wet the master for at least a brief period of a few seconds prior to its use in order that it may age and mature properly for better and clearer reproduction. However, such aging causes the masters, that tend to become limp, to become even more limp, and therefore a projection type feed device becomes more unreliable.

In a system such as outlined in FIGURE 1, wherein a series of masters may be employed in chronological order, and a collating device provided to accept the printed copies in proper sequence, it is highly disruptive of the production if one of the masters is destroyed in the process before it is able to produce its quota share of printed copies. Hence, in order to avoid shutting down the system while a new master is prepared, a very positive feed system is provided by this invention to avoid any possibility of misfeeding the master from the conveyor 42 into the master cylinder 17.

Refer to the illustrations of FIGURES 6–8. These three illustrations are true illustrations of the structure of the apparatus as taken from the line 6—6 of FIGURE 5, but the surrounding apparatus is eliminated from these views in order to enable a clear illustration of the structure and operation of the swinging loading arms 16. In the FIGURE 5, only three such loading arms are illustrated, the FIGURE 5 being a broken illustration. In actual operation, a plurality of such arms are spaced across the face of the master cylinder in order to provide abundance of firm gripping support to the lead edge of the master. Generally, only one of the loader arms will be referred to hereinafter, and it will be understood that the structure and operation is the same for all. The plurality of loading arms serves to minimize the possibility of lateral slack or looseness of the lead edge of the master. If lateral slack should exist, the excess material will be folded into wrinkles as the grippers close upon the master. The loader arms are relatively narrow and the gripper system relatively wide in order to provide a minimizing of wrinkle possibility.

The loader arms 16 are each built upon a body structure 50 having a guide foot 51 which cooperates with the upper surface of the conveyor 42 in order to present a guide for a master. A pin 52 carried by the body 50 provides a fixed reference anvil surface against which a master may be pressed for secure gripping. Foot 51 has a heel notch 54 which serves as a stop gauge for aligning the master with respect to the body 50. The body is carried for pivotal swing action upon a drive shaft 53.

The FIGURE 6 represents a "home" or starting position of the loader arms wherein it is positioned to re-receive a master from the conveyor 42. A pivoted clamping finger 55 rotates about an axis to press against the pin 52 and thus grip the master.

Two pivoted levers 56 and 57 are carried by the body 50 on pivotal centers and work together as a spring powered knuckle drive device to close the finger 55 with respect to pin 52. A spring 58 urges the links to the position shown in FIGURE 7 wherein the finger 55 is driven to a closed condition. Lever 57 carries a cam follower end 60 which is provided to receive cam forces from two separate camming devices for opening the finger 55 with respect to the pin 52 through the linkage structure. One such cam device is a swingable cam arm 62 mounted on a pivot shaft 63. Shaft 63, upon rotation in a counterclockwise direction as seen in FIGURE 6, will cause arm 62 to open finger 55 for reception of a master. This is the rest or home position situation illustrated in FIGURE 6 as a master receiving position. In order to grasp the master, the shaft 63 is rotated in a clockwise direction as illustrated in FIGURE 7, to relieve pressure from the cam follower 60, thereby allowing spring 58 to rock the levers 56 and 57 into the FIGURE 7 position wherein the finger 55 is closed upon a master, gripping it tightly against the pin 52. Otherwise, there is no change in the position of the loader arms 16 between the FIGURE 6 and FIGURE 7 illustration. That is, the shaft 53 has remained stationary in these two series of illustrations.

Although not illustrated in these drawings, an electrical control system further illustrated and discussed in companion application Ser. No. 568,840, entitled Control for Master Processing and Duplicating, sets forth in more detail the presence of spaced switches associated with the plurality of the swinging loader arms 16 in order that the actuating mechanism operating the shaft 63 will be inoperative until a master is in contact with each of the plurality of switches. In this manner, placement of the switches for sensitive detection of the master will assure the insertion of the master into the series of swinging arms in correct angular position, and prevent operation of the loading mechanism whenever the master arrives on conveyor 42 angularly related to the master cylinder 17.

Upon ascertaining that the master is properly located, and closing of the gripper finger 55 as shown in FIGURE 7, timing apparatus not illustrated in these drawings but set forth in the companion application referred to, causes driving apparatus to rotate the shaft 53 clockwise and accelerate the master gripped by the arms 16 to the peripheral speed of the cylinder 17. The path of swing of the mated pin 52 and finger 55 approaches close to the periphery of the cylinder 17, but in order to make the transfer to the cylinder, a gripper system 65, carried by the cylinder 17, is caused to project from the surface of the cylinder 17 and take the master from the swinging loader arms 16.

A second cam is indicated by reference character 66 in FIGURES 6–8, and the follower 60 contacts the cam 66 and causes the grip upon the master to open just as the cylinder gripper system 65 begins to grasp the master. The arms 16 are caused to continue to swing beyond the FIGURE 8 position to a substantially lateral orientation, and dwell there until the master is completely loaded upon the cylinder 17 and safely out of harms way, whereafter the arms 16 are returned to the FIGURE 6 position to await the arrival of a replacement master for the next loading operation.

Operation of the swinging loader arms may be further understood by reference to the FIGURE 9 of the drawings. FIGURE 9 is an elevation indicated by the line 9—9 on FIGURE 5. It should be observed that the direction of view of FIGURE 9 is opposite from the direction taken to illustrate FIGURES 6–8. The reason for the reversal of the FIGURES 6–8 is in order that the body 50 not obscure the view of the structural parts which do the gripping and operation.

After a master has reached the open loader arms 16 as shown in FIGURE 6, and the plurality of sensing devices have indicated correct alignment, then when the control system signals for master insertion, a solenoid 70 shown in FIGURE 9 operates a pivot cam 71 to pull a link 72 which draws latch 73 away from catch arm 74. Catch arm 74 may then rotate counterclockwise under the urge of a spring 75. The catch arm 74 is mounted on the shaft 63 which operates the cam arm 62, and therefore drives the cam arm 62 from the FIGURE 6 to the FIGURE 7 condition. Note that counterclockwise rotation in FIGURE 9 is identical to clockwise rotation in FIGURE 7 because of the reverse direction of view. Such rotation of shaft 63 releases pressure from the cam follower 60 and allows the finger 55 to close upon a master.

The solenoid 70 is carried on a side plate 76 of the duplicating machine. Also mounted on the plate 76 is a bell crank 77 held in a home position by a latch 78 which is normally held by spring means not shown, into a catch shoulder 79 on the arm of the bell crank 77. A solenoid 80 is connected to withdraw the latch 78 for release of the arm of bell crank 77.

A cam wheel 81 operated from the power source of the duplicating machine is driven at a regular rotating speed, and a cam follower 82 carried by bell crank 77 is aligned to ride the surface of the wheel 81 whenever the bell crank is released from its home position.

The arm of bell crank 77 opposite the follower 82 is equipped with a catch 83. A latch 84 is pivotally mounted by pivot 85 and is urged in a clockwise rotating direction as viewed in FIGURE 9 by leaf spring 86, which urges the latch into a position to engage with the catch 83 whenever the catch 83 is aligned with the latch.

Latch 84 has a cam follower end 87 configured to cooperate with a cam arm 88 carried on the pivot cam 71.

Thus, whenever the solenoid 70 is inactive, as illustrated in FIGURE 9, the arm 88 is positioned to contact the cam follower end 87 and force the latch 84 to a counterclockwise rotation position preventing latching, or if previously latched, releasing the latched condition.

Pivot 85 is carried by a gear segment 90. Segment 90 is pivotally mounted around the same center as the bell crank 77. Accordingly, upon engagement of latch 84 and catch 83, the gear segment 90 will swing with the bell crank 77 as long as the engagement exists.

A gear segment 91 carried by shaft 53 is engaged with gear segment 90, and is driven thereby. Hence, movement of the gear segment 90 in a clockwise direction as viewed in FIGURE 9, will cause a counterclockwise direction of movement in gear segment 91 which will in turn drive the shaft 53 in a counterclockwise direction as viewed in FIGURE 9.

Again, bearing in mind the reverse direction of view in the FIGURES 6–8, this drive of shaft 53 will cause a clockwise direction of movement of the loader arms 16 in FIGURES 6–8 performing the rotary acceleration from a receiving position as shown in FIGURE 6 to a terminal position beyond the FIGURE 8 as described.

In the operation of this portion of the structure, the control mechanism signals the solenoid 80 prior to a signal to the solenoid 70, releasing the follower 82 to follow the rotating cam wheel 81 before latch 73 is released. The bell crank 77 then begins to follow the wheel 81 from the home position as shown in full lines in FIGURE 9 toward the latching position shown in phantom outline in the FIGURE 9. The control mechanism is arranged so that just prior to the arrival into the latch position of the phantom outline illustration, the solenoid 70 will be actuated to rotate the pivot cam 71 and release the shaft 63 for its rotative actuation of the clamping device of the loader arms to clamp onto the master. Thus, only a moment of time is required, thereafter, before the catch 83 on the end of bell crank 77 reaches the latching position, and it will be in proper position for latching whenever the cam arm 88 is pivoted away from the follower 87 allowing the latch 84 to move in and grasp the catch 83 as it arrives in the proper position.

Then, the return drive of the bell crank 77 under the rotating drive of the cam wheel 81 will bring the swingable gear segment 90 along with the arm of the bell crank and force a rotation of the shaft 53, causing the loader arm to quickly accelerate from the master receiving position, through the transfer position shown in FIGURE 8, and on to a terminal rest position out of the way of the master progressing onto the cylinder 17.

As the wheel 81 returns the bell crank 77 to the full line position of FIGURE 9, the latch 78, long since released by the solenoid 80, will pick up and lock the catch 79 to prevent further movement of the shaft 53, and thus prevent return of the loader arms 16 until later released.

The cam arm 62 must be returned to the FIGURE 6 position in order that the arms 16 upon returning to the home position of FIGURE 6 will be actuated to open the finger 55 for the admission of a new master.

FIGURE 10 illustrates the condition also illustrated in the FIGURE 6, wherein the cam arm 62 presses against the follower 60 to hold the member 16 ready for acceptance of a new master. A cam 95 carried by the shaft 53 is rotatable upon drive of the shaft 53 from the starting position illustrated in FIGURE 10, counterclockwise to a position in which the longitudinal axis of the cam 95 is substantially horizontal.

A transfer follower 96 is mounted together with the latch 73 on a common pivot 97. A cam rider 98 on one end of transfer follower 96 follows the cam 95 and actuates an opposite end 99 in a clockwise direction as viewed in FIGURE 10.

At the start of the cycle, whenever the solenoid 70 is actuated, the latch 73 causes the catch 74 to be released, allowing the shaft 63 to rotate counterclockwise as viewed in FIGURE 10. A cam follower arm 100 carried by the shaft 63 falls into contact with the end 99 of the transfer follower 96. Therefore, as the shaft 53 rotates in a counterclockwise direction to load a master onto the master cylinder, and to continue thereon to a substantially horizontal dwell position, the end 99 of the transfer follower 96 operates through the cam follower 100 to rotate the shaft 63 in a clockwise direction, and bring the catch 74 into position wherein it is caught by the latch 73, and held in the cocked and ready position.

Upon signal from the control system, preferably after about one or two full revolutions of the master cylinder, the solenoid 80 is again actuated to release the bell crank 77 for operation with the cam wheel 81. The spring drive, which is not shown, causes the bell crank to rotate in a counterclockwise direction as shown in FIGURE 9 and thus return the gear segment 90 and its associated gear segment 91 to the position as shown in FIGURE 9. Such return drive causes the loader arms 16 to swing back from their substantially horizontal dwell position to the master receiving position as illustrated in FIGURE 6. The cam arm 62 having been reestablished in its FIGURE 6 position, will be contacted by follower 60 to open gripper finger 55.

At the time of the second cycle of the bell crank 77 for return of the loader arms, the solenoid 70 has again reached an inactive stage and has, therefore, placed the cam arm 88 into position wherein the follower end 87 of the latch 84 will be contacted and moved to the unlatched position illustrated in FIGURE 9. Hence, as the bell crank returns the gear segment 90 to the position shown in FIGURE 9, the latch will release the driving interconnection, and the bell crank will return with the next operation of the cam wheel 81 without the gear segment 90.

The sequence of operation has, therefore, gone full cycle in:

(1) causing the member 16 gripping devices to take a master;

(2) cycle the master to the master cylinder by moving between the master receiving position and a terminal position, and;

(3) thereafter restoration of the entire loader arm system ready for the next sequence.

The central control system will thereafter activate the master feeder system to feed another master from the stack 10 through the wetting system and cause that new master to be delivered to the loader arm system 16 ready for its presentation after the preceeding master has been cycled through the printing system for the required number of prints. The next master will start through the wetting system about the time the last copy sheet is fed in the prior duplicating cycle.

*Master cylinder gripper system*

Figure 11:
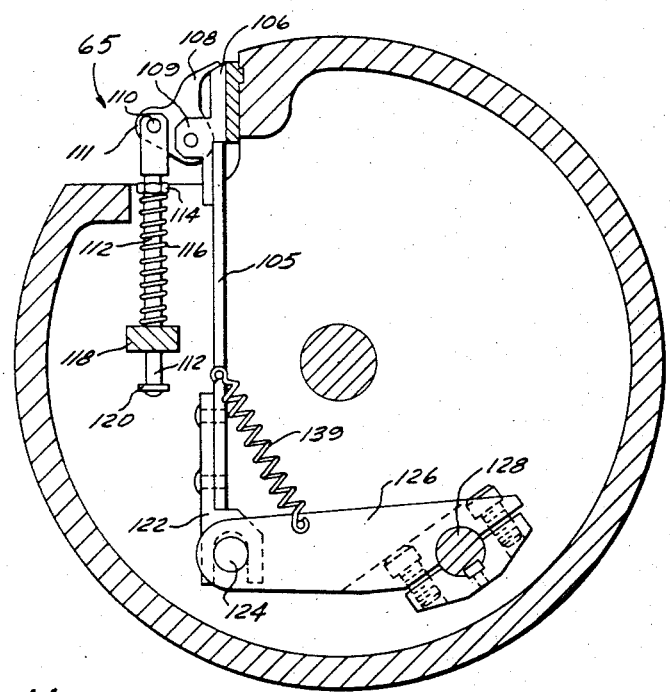
FIGURE 11 is a section taken along line 11—11 of FIGURE 5.

The gripper system 65 is composed of a plurality of separate gripper devices which project between the plurality of loader arms 16, but for ease of explanation, only a section through the cylinder is used, and this section FIGURE 11 gives the appearance of only one device. The actuating structure for the several devices is one combined structure, and an understanding of one will give understanding of the several working together.

The gripper system 65 is constructed in such a manner that each device will project from the cavity in which such gripper devices are normally held, and extend out into a path which merges with the swinging path of the gripper end of the loading arm 16. The gripper devices are positioned between the plurality of arms 16 in order that they may momentarily assume an aligned position for master transfer.

Figure 12:
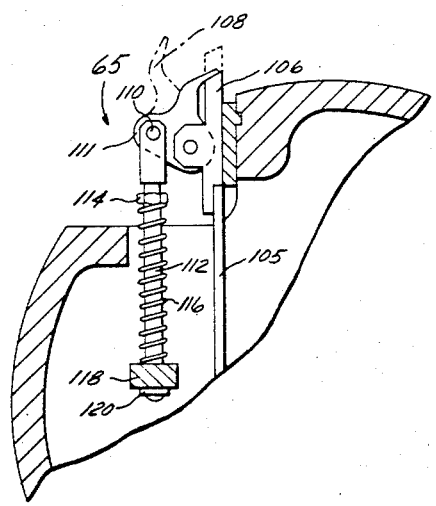
FIGURE 12 is a fragmentary portion of the section shown in FIGURE 13, illustrating the gripper part in an actuated position.

The gripper devices are mounted on a carriage 105 which will best be seen and understood by reviewing the FIGURES 11 and 12. A pad 106 in each device serves as a reference point against which a pressure may be applied to grip the master, much as the purpose pin 52 serves with respect to the members 16.

A grip finger 108 is pivotally mounted by a tab 109 on carriage 105. A pivot pin 110 mounts the grip finger 108 for rotative movement between the gripping position shown in FIGURE 11, and an open position shown in phantom outline in the actuated view of FIGURE 12. The grip finger 108 is seen in these comparative views as being openable to a wide position for accepting a master, and closing tight against the pad end 106 to grip the master. The open position is extended beyond the periphery of the cylinder 17, whereas the closed position shown in FIGURE 11 is substantially flush to the circumference of the cylinder.

The grip finger 108 has an ear 111 for pivotal attachment of a stem 112. The stem 112 is employed to control the time and extent of opening and closing of the grip finger 108.

Stem 112 has a stop shoulder 114. A coil spring entwines the stem and abuts stop 114. A bar 118 extends across the cylinder from end to end. Stem 112 extends through bar 118, and the spring abuts, and is confined by, the bar. Thus, the spring 116 tends to rotate the grip finger 108 about the pivot 110 toward its normally closed position shown in FIGURE 11. The plurality of such springs 116 urges the grip system to an extended position.

The stem 112 has a capped end 120 below the bar 118 which limits the amount of vertical movement of stem 112 under urge of spring 116. This condition is shown in FIGURE 12. The carriage 105 is driven in a fixed path, which path assumes a cordial relationship to the circumference of the cylinder 17 when viewed in cross section as shown in FIGURE 11. When retracted into the FIGURE 11 position, the carriage pulls the pivot 110 into the cylinder and causes the grip finger 108 to close under the urge of the spring 116, whereafter the entire assembly of closed grip finger and carriage moves down into the cylinder. Further retraction causes the spring to further compress, but no other action takes place.

When the carriage 105 is actuated to move out of the cylinder, the grip finger 108 does not open immediately for the reason that the resilient spring 116 tends to first open to its maximum extent and therefore continues to cause a clockwise rotational drive upon the grip finger 108 as viewed in the FIGURE 11, until the carriage 105 has extended the stem 112 to bring the cap end 120 into contact with the bottom of the bar 118. At such stage, the stem 112 can no longer advance, and therefore further advance of the carriage 105 will cause a counterclockwise rotation of the grip finger 108 from the FIGURE 11 relative position to the open position as shown in phantom outline in FIGURE 12. Thus, the forward movement of carriage 105 causes the pad end 106 to be positioned beyond the periphery of the cylinder 17, and causes the grip finger 108 to be opened.

The mechanism which operates the carriage 105 is coordinated such that the pad end 106 is advanced to the FIGURE 12 position as the gripper system devices 65 approach the FIGURE 8 relationship of the loader arm 16, and as the cylinder moves in a counterclockwise direction in the FIGURE 8, the path of travel of the pad end 106 merges with the position of the master held between the pin 52 and the finger 55 of loader arm 16. Then, the coordinating mechanism causes the carriage 105 to retract and close the grip finger 108 against the pad end 106 while it is in the aligned relationship with the master positioned in the loader arms 16. Thereby, the grippers assume control of the master at the instant when the arms 16 come into contact with the cam 66 and releases that control. Hence, there is a positive control of the master at all times without possibility of any free floating movement causing mis-direction of the master.

The carriage 105 appears in the plane of view of FIGURE 11, and is a plate type member with a multiple number of individual sections extending up and ending in a multiple number of pad ends 106 across the cylinder 17. However, the FIGURES 11 and 12 illustrate the principle of operation of each one of the cooperating pad ends and grip fingers. Nevertheless, for accurate description, the carriage 105 is a plate member which ends in a hook formation 122 seated upon a shaft 124. A spring 139 pulls the arms 126 and hook formation 122 together in order that the arm 126 may over-travel after carriage 105 seats the pad end 106 into its home position. The strength of spring 139 must be greater than the combined strength of springs 116 in order to cause proper seating of the device 65. Shaft 124 is a longitudinal rod extending substantially across the length of the cylinder, and is supported between two spaced crank arms 126 placed at either end of the cylinder and driven in an oscillatory path by means of a drive shaft 128. Drive shaft 128 extends through the end of the cylinder and is the source of operating power and control dictating the time and extent of movement of the carriage device 65.

Figure 13:
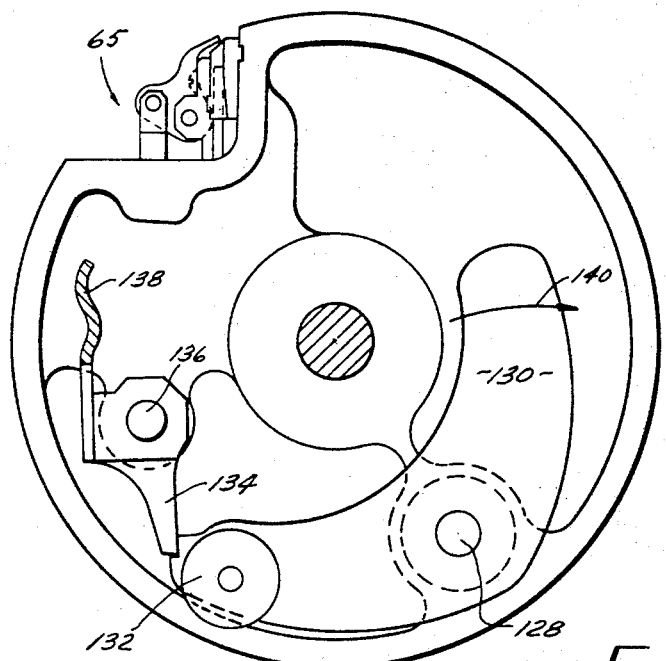
FIGURE 13 is an end view of the master cylinder as taken along line 13—13 of FIGURE 5.
Figure 14:
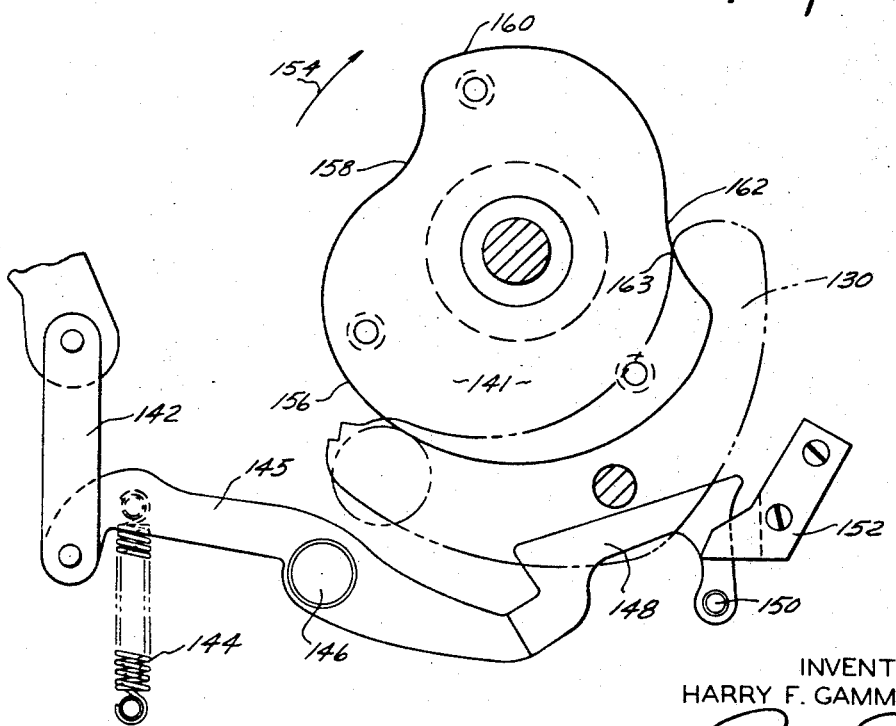
FIGURE 14 is a schematic and illustrates the relationship of a fixed cam carried by the machine frame and a motion translating linkage system operating a drive shaft within the master cylinder, arranged as if viewed along the line 14—14 of FIGURE 5.

Operation of the shaft 128 is the controlling factor in operating the insertion and ejection of masters with respect to cylinder 17. FIGURE 13 is an end view of the cylinder as viewed along the line 13—13 of the FIGURE 5. FIGURE 14 is viewed along the same line in FIGURE 5, but is directed oppositely from the FIGURE 13 view.

On the end of the cylinder 17, an arcuate lever arm 130 is provided with a cam follower roller 132. A latch rocker 134, pivoted about a pivot rod 136, carries an actuator foot 138 for operation of the rocker. Hence, in the FIGURE 13 position, the arcuate lever 130 is locked by the latch rocker 134 against clockwise rotation, but may be released by actuation of the foot 138. Arrow 140 on the end of the arcuate lever 130 opposite the roller 132 indicates the direction in which that end of the lever is urged. Spring actuating means is employed to drive the arcuate lever 130 in the clockwise direction thus indicated, but the spring apparatus actually used is specific to the particular device and is therefore eliminated from the drawing for the sake of clarity. Any device which will cause a suitable resilient urge of the lever 130 in the direction of arrow 140 will suffice for the intended purpose.

In the FIGURE 13, the end of the foot 138 is seen to be cross-hatched, indicating a portion cut away. Observation of FIGURE 5 will indicate that the line 13—13 cuts through the foot 138. The latch rocker 134 is carried on the end of the cylinder 17, and the foot 138 bridges over into the area of the apparatus illustrated in FIGURE 14, carried by the frame of the lithograph machine.

In FIGURE 14, a stationary cam plate 141 provides a track upon which the roller 132 may ride when released, under the urge of the yieldable device imposing clockwise rotation upon the lever 130 as viewed in FIGURE 13.

A control system link 142 is connected to related control portions of the lithographic machine, and is operated by the central control system. The link 142 is simply released at the time rejection or insertion of a master is desired. A spring 144 operates to pull a lever 145 about a pivot 146 in a counterclockwise direction as viewed in FIGURE 14. Head 148 on the lever 145 is then pulled toward the cam plate 141 until a stop pin 150 comes into contact with a stop 152. When the head 148 is in the position illustrated in the FIGURE 14, the foot 138 of rocker 134 circles free of contact with the head 148. However, upon release of the link 142, the head 148 is positioned such that the curved slide end of the foot 138 makes contact with head 148 and thus causes the latch rocker 134 to rotate and release the arcuate lever 130.

Release of the lever 130 places the roller 132 in condition to ride the surface of the cam plate 141. Cam plate 141 may better be related to the cylinder 17 by observing the arrow 154 which indicates the direction of the cylinder rotation with respect to the cam. Cam 141 has a high curved surface 156 which will move the roller 132 sufficiently great distance to enable the latch 134 to catch the lever and prevent further following of the cam plate. No other area of the cam plate is sufficiently high to cause such latching.

After release of the roller 132, which is accomplished at the high point of the cam plate 141, the roller 132 follows into a recess area 158 of the cam plate 141 and thus allows the shaft 128 to rotate and drive the carriage 105 through the cycle previously described, causing the return of the carriage as the roller 132 reaches a high lobe 160. However, the lobe 160 and the arcuate area of the cam plate 141 thereafter is not sufficiently spaced from the center of rotation of the cylinder to elevate the follower catch into locking conditions with the latch rocker 134. Therefore, roller 132 follows the surface of the cam plate 141 and draws the carriage fully within the cylinder in order to remove it from interference from other mechanism, but does not hold the carriage permanently locked into its internal position.

The roller thereafter reaches a second recess 162 which causes the carriage to project the gripper system 65 again, and once again withdraw the carriage back into the cylinder upon reaching a lobe 163. The lobe 163 does begin the high point of the cam, and thus can cause the latching of the lever 130 to prevent further actuation. Accordingly, unless the control system continues to release the link 142, the gripper system 65 will be projected and retracted twice during one revolution of the master cylinder and then locked into its internal position against further actuation.

It has been found to be good practice to use the recess area 158 in such an oriented relationship with respect to the cylinder that the gripper system 65 is positioned for ejecting of the master, and recess 162 for accepting a new master.

Those familiar with lithographic machines will recognize that the loader arms 16 occupy a space which is often used for inking rollers, and consequently the moisture supply and inking rollers are shifted into the area where master ejection usually takes place. Consequently, the master ejecting takes place such that the master is progressing in a vertical direction as indicated by the arrow in FIGURE 1, and such direction leads to physical structure of the machine preventing a continuation of this direction of movement. Therefore, a rapidly rotating toothed wheel 164 rotates in a direction to catch the end of the master and divert it into a horizontal plane wherein it is caught in a basket 168.

From the foregoing description, it will be seen that the loading arms provide a grip action between the pin and finger which may be referred to as a loading means which has a path of travel between a master receiving position and a terminal position. The master is carried along this path until released to the grippers.

The gripper system likewise presents the cooperating pad 106 and grip fingers 108 as a master holding clamp means carried by said cylinder for holding a master sheet upon the cylinder. The master holding clamp means has a master receiving path of travel in its projection and retraction. This path and the path of the loading means converge in that they close toward one another in the loading action, then merge in a limited overlapping area, and separate in a diverging path as the gripper system takes the master into operative position on the cylinder.

Whereas the present invention has been shown and described herein in what is conceived to be the best mode contemplated, it is recognized that departures may be made therefrom within the scope of the invention which is, therefore, not to be limited to the details disclosed herein, but is to be afforded the full scope of the invention as hereinafter claimed.

What is claimed is:

1. A master processing and duplicating system comprising:
   a surface wetting device having a fountain roller, the surface of said roller having a strong affinity for wet paper pressed to said surface, at least one scrub roller means rotating adjacent said roller surface at a differential speed with respect to said fountain roller for rubbing wetting solution onto masters passing therethrough, means for feeding master sheets between said fountain roller and scrub roller, and means for stripping masters from said fountain roller;
   mechanical grip transfer means for clamping the lead edge of a master delivered from said surface wetting device and pulling said master by the lead edge through a path of travel, said means clamping said lead edge at a plurality of spaced intervals along said lead edge;
   a lithographic printing machine having a master holding cylinder;
   master holding clamp means carried by said cylinder, said clamp means having a plurality of gripping devices, said gripping devices entering said master path of travel and grasping said master lead edge between said spaced intervals of the transfer means to pull the master lead edge uniformly to said cylinder;
   control means for establishing a sequence of process to moisten and apply ink to a master on said cylinder and print a series of sheets from said master, and thereafter cause said master holding clamp means to project the leading edge of the master a distance from the surface of said cylinder.

2. In a lithographic printing machine having a first cylinder for holding a master by one edge with the master draped around the cylinder surface, an inking roll system with a form roll for application of printing fluids, and a second cylinder running substantially in surface engagement with said first cylinder to receive an impression from an inked master thereon; an improvement in the provision of a mechanical master loading structure for applying a master to said first cylinder as it rotates, comprising:
   mechanical grip transfer means for clamping said one edge of a master at a master receiving station and delivering said master by the lead edge through a path of travel;
   a master holding clamp means carried by said first cylinder, said clamp means being extendable from the cylinder surface during a part of the cylinder rotation to thereby describe an arcuate path different from the cylinder surface and extending beyond said surface, said clamp means in said arcuate path entering and merging with said master path of travel and positively grasping a master while in said arcuate path by said lead edge to pull the master lead edge from said arcuate path to the cylinder surface as the clamp means returns to the cylinder in said arcuate path;
   said paths of travel of said master holding clamp means and said mechanical grip transfer means being mergable over a portion of said paths with said mechanical grip transfer means and clamp means converging as they approach the area of merger, and diverging as they leave said area of merger;
   means for actuating said mechanical grip transfer means to grasp a master at said master receiving station and release the master in said area of merger;
   means for actuating said clamp means to close upon a master in said area of merger; and
   means for coordinating said release by said mechanical grip transfer means and closing of said master holding clamp means to effect transfer of a master from said mechanical grip transfer means to said master holding clamp means with no hiatus of gripping action.

3. A mechanical master loader as defined in claim 2, further characterized in that said loading means comprises:
   at least one swinging loading arm body;
   a guide foot surface at one end of said body;
   a clamp surface, said guide foot surface providing a paper guide to direct sheets into a position overlaying said clamp surface;
   a pivoted clamping finger operable between a first position pressed to said clamp surface and a second position opened from said clamp surface;
a cam follower carried by said body, and linkage means for operating said finger responsively to actuation of said cam follower; and
cam means situated to be contacted by said follower for providing control forces upon said follower as the loading arm body is operated between master loading and terminal positions.

4. A mechanical master loader as defined in claim 2 further characterized in that said holding clamp means comprises:
a longitudinally extending peripheral slot opening in said master cylinder;
a carriage located in said cylinder and mounted for reciprocation in a plane which lies in cordial relationship with respect to the periphery of said cylinder, said carriage having a plurality of separate pad ends, said carriage reciprocable between a projected position wherein said pad ends are extended through said slot opening beyond said cylinder periphery, and a retracted position within said periphery; and
a clamp finger for each pad end carried by said carriage, and control means associated with each finger for holding said finger closed as the carriage projects said pad ends through said slot opening, causing the finger to close as the carriage returns into the cylinder, said control means allowing said finger to open only in the terminal portion of said carriage projected position.

5. A mechanical master loading structure for applying a master to a cylinder as it rotates, as defined in claim 2, further characterized in that:
said loading means comprises a plurality of swinging loading arms each pivoted between the ends thereof and each having a master gripping end swingable in substantially a circular path between a master receiving position and a terminal position, said loading arms being spaced from one another across the width of said cylinder and occupying a total physical space less than the length of the cylinder;
a master holding clamp means, a supporting carriage which operates in a cordial relationship with respect to a section through the cylinder, said clamp means carried by said carriage and presenting a plurality of gripper devices occupying substantially the remaining space between adjacent swinging loading arms, said carriage located within the cylinder and operating reciprocably to project a gripper device from the cylinder as the clamp means approaches the arcuate path of the loading arm, said carriage means moving said grippers into an aligned relationship with respect to the swinging loader arms and, thereafter withdrawing the gripper devices back into the cylinder; and
means for operating the swinging loading arms to a release condition as the clamp means is operated to a clamping condition during the physical alignment relationship.

6. A mechanical loading structure as defined in claim 2, further characterized in that:
said loading means having a pivoted arm formation with closable grippers swingable through an arcuate path which approaches the periphery of said first cylinder;
said master-holding clamp means having closable jaws providing a master sheet receiving receptacle, said clamp means carried by said first cylinder, and means for extending said clamp means in an excursion beyond the surface of said cylinder and return during revolution of the clamp means position after the clamp means passes said area and before again reaching said area;
said clamp means describing a non-circular path during the compound movement of revolution and extension, said path having a portion which substantially merges with a portion of said loading means arcuate path in a merger zone; and
means for first closing said grippers and thereafter accelerating to said merger zone and to the peripheral speed of said closable jaws, and for opening said grippers and thereafter closing said jaws in said merger zone for transfer of a master from the pivoted arm grippers to the cylinder clamp means.

7. A mechanical loading structure as defined in claim 2, further characterized in that:
said master-holding clamp means having closable jaws providing a master sheet receiving receptacle, said clamp means carried by said first cylinder, and means for extending said clamp means in an excursion beyond the surface of said cylinder and return during revolution of the clamp means position after the clamp means passes said area and before again reaching said area; and
means for opening and thereafter closing said clamp means during said excursion.

8. A mechanical loading structure as defined in claim 2, further characterized in that:
said master-holding clamp means having closable jaws providing a master sheet receiving receptacle, said clamp means carried by said first cylinder, and means for extending said clamp means in an excursion beyond the surface of said cylinder and return during revolution of the clamp position after the clamp means passes said area and before again reaching said area;
means for opening and thereafter closing said clamp during said excursion; and
said mechanical grip transfer means driven for accelerating a master sheet from a standing condition to at least the speed of said master holding clamp means in its extended and open condition and for directing said master sheet along a path and in a timed relationship which causes the position of said master to coincide with said receptacle as said jaws are closing.

UNITED STATES PATENTS
References Cited

| | | | |
|---|---|---|---|
| 2,031,136 | 2/1936 | Sewick | 101—409 XR |
| 2,177,578 | 10/1939 | Neidich | 101—409 XR |
| 2,220,282 | 11/1940 | Ritzerfeld | 101—132.5 |
| 2,252,204 | 8/1941 | Reilly | 118—258 XR |
| 2,352,658 | 7/1944 | Richmond et al. | 117—111 |
| 2,360,015 | 10/1944 | Rockhill | 101—132.5 |
| 2,398,646 | 4/1946 | Karbach et al. | 101—415.1 XR |
| 2,603,154 | 7/1952 | Davidson | 101—246 |
| 2,642,282 | 6/1953 | Backhouse | 271—53 |
| 3,153,380 | 10/1964 | Gericke | 101—142 |
| 3,169,476 | 2/1965 | Fielding | 271—51 XR |
| 3,190,645 | 6/1965 | Reinartz | 271—51 |
| 3,221,652 | 12/1965 | Mestre | 101—409 XR |
| 3,231,418 | 1/1966 | Muggleton | 117—111 |

ROBERT E. PULFREY, *Primary Examiner.*

E. S. BURR, *Assistant Examiner.*

U.S. Cl. X.R.

101—409, 415.1; 271—82